United States Patent
Rösch et al.

[11] Patent Number: 6,127,495
[45] Date of Patent: *Oct. 3, 2000

[54] PREPARATION OF POLYMERS OF $C_2$-$C_{12}$-ALKENES WITH THE ADDITION OF A REACTION RETARDER

[75] Inventors: Joachim Rösch, Ludwigshafen; Wolfgang Bidell, Mutterstadt; Franz Langhauser, Bad Dürkheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,386

[22] Filed: May 30, 1997

[30] Foreign Application Priority Data

May 31, 1996 [DE] Germany .................. 196 21 838

[51] Int. Cl.$^7$ ........................................... C08F 2/38
[52] U.S. Cl. ................. 526/82; 526/132; 526/134; 526/151; 526/152; 526/153; 526/904
[58] Field of Search .................. 526/82, 132, 134, 526/904, 151, 152, 153

[56] References Cited

U.S. PATENT DOCUMENTS

| | | |
|---|---|---|
| 4,794,096 | 12/1988 | Ewen . |
| 4,892,851 | 1/1990 | Ewen et al. ............... 502/104 |
| 5,066,736 | 11/1991 | Dumain et al. . |
| 5,187,250 | 2/1993 | Asanuma et al. ............ 526/348.6 |
| 5,371,260 | 12/1994 | Sangokoya . |
| 5,391,793 | 2/1995 | Marks et al. . |
| 5,444,134 | 8/1995 | Matsumoto ............... 526/159 |
| 5,780,562 | 7/1998 | Shimizu et al. ............ 526/129 |
| 5,840,645 | 11/1998 | Ohno et al. . |

FOREIGN PATENT DOCUMENTS

| | | |
|---|---|---|
| 284 708 | 10/1988 | European Pat. Off. . |
| 582 480 | 2/1994 | European Pat. Off. . |
| 621 279 | 10/1994 | European Pat. Off. . |
| 630 910 | 12/1994 | European Pat. Off. . |
| 633 264 | 1/1995 | European Pat. Off. . |
| 91/09882 | 7/1991 | WIPO . |

OTHER PUBLICATIONS

Jim Stevens, "Metallocene and Other Single Site Catslysts, a Revolution i Olefin Polymerization", PTO presentation, Dec. 1994.

Encyclopedia of Inorg. Chem. ed. R.B. King, 1994, vol. 1, p. 116 f. and p. 401 f.

Jorl. of Organometallic Chemistry, 369, 1989, 359–370.

P. Galli, J.C. Haylock, Progr. Polm. Sci., 1991, 16, 443.

*Primary Examiner*—David W. Wu
*Assistant Examiner*—Ling-Siu Choi
*Attorney, Agent, or Firm*—Keil & Weinkauf

[57] ABSTRACT

Polymers of $C_2$–$C_{12}$-alkenes are prepared at from −50 to 300° C. and from 0.5 to 3000 bar in the presence of a catalyst system by a process in which a compound of the general formula I

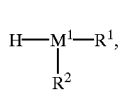

where $M^1$ is boron, aluminum, gallium, indium or thallium and $R^1$ and $R^2$ are each hydrogen, $C_1$–$C_{10}$-alkyl, $C_6$–$C_{15}$-aryl, alkylaryl or arylalkyl each having 1 to 10 carbon atoms in the alkyl radical and 6 to 20 carbon atoms in the aryl radical, or 5- to 7-membered cycloalkyl which in turn may carry $C_1$–$C_{10}$-alkyl as a substituent, or $R^1$ and $R^2$ together form a cyclic group, is added of 4 to 15 carbon atoms.

7 Claims, No Drawings

PREPARATION OF POLYMERS OF $C_2$-$C_{12}$-ALKENES WITH THE ADDITION OF A REACTION RETARDER

Preparation of polymers of $C_2$–$C_{12}$-alkenes with the addition of a reaction retarder The present invention relates to processes for the preparation of polymers of $C_2$–$C_{12}$-alkenes at from -50 to 300° C., and from 0.5 to 3000 bar in the presence of a catalyst system.

In the preparation of polymers of $C_2$–$C_{12}$-alkenes, troublesome polymerization phenomena may occur in the catalyst line owing to a high catalyst activity.

EP-A 630 910 states that the activity of metallocene catalyst systems can be reduced by the addition of Lewis bases, such as alcohols, ketones, ethers, etc. However, the reversibility of this deactivation is ensured only with certain limitations since large amounts of alkylaluminum cocatalysts have to be added for reactivation.

U.S. Pat. No. 5,066,736 discloses that the activity of Ziegler-Natta-catalysts can likewise be reduced by the addition of Lewis bases. Here too, alkylaluminums must be added for reactivation.

It is an object of the present invention to provide processes for the preparation of polymers of $C_2$–$C_{12}$-alkenes, in which active catalysts can be briefly deactivated so that no troublesome polymerization phenomena occur, but in which the deactivated catalyst systems become active again without the addition of further compounds.

We have found that this object is achieved by a process for the preparation of polymers of $C_2$–$C_{12}$-alkenes at from –50 to 300° C. and from 0.5 to 3000 bar in the presence of a catalyst system, wherein a compound of the general formula I

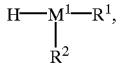

wherein
  $M^1$ is boron, aluminum, gallium, indium or thallium and
  $R^1$, $R^2$ are each hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical, or 5- to 7-membered cycloalkyl which in turn may carry $C_1$–$C_{10}$-alkyl as a substituent, or $R^1$ and $R^2$ together form a cyclic group of 4 to 15 carbon atoms, is added.

Among the $C_2$–$C_{12}$-alkenes used in the novel process, $C_2$–$C_{12}$-alk-1-enes are preferred.

Ethylene, propene, but-1-ene, pent-1-ene, 4-methyl-pent-1-ene, hex-1-ene, hept-1-ene and oct-1-ene and mixtures of these $C_2$–$C_{12}$-alk-1-enes are preferably used. Homo- or copolymers of ethylene or of propene are particularly preferred, the amount of ethylene or propene in the copolymers being at least 50 mol-%. Preferred copolymers of propene are those which contain ethylene or but-1-ene or mixtures thereof as further monomers, and preferred copolymers of ethylene are those which contain propene, but-1-ene, hex-1-ene or oct-1-ene or mixtures thereof as further monomers.

The novel process is carried out at from –50 to 300° C., preferably from 0 to 150° C. and from 0.5 to 3000, preferably from 1 to 80, bar. Preferred reaction times are from 0.1 to 24 hours, in particular from 0.2 to 6 hours.

The polymerization may be carried out in solution, in suspension, in liquid monomers or in the gas phase. The polymerization is preferably carried out in liquid monomers or in solution.

The process may be carried out either continuously or batchwise. Suitable reactors include continuously operated stirred kettles, it also being possible to use a plurality of stirred kettles connected in series (reactor cascade).

The novel process is carried out in the presence of a catalyst system. Examples of suitable catalyst systems are Ziegler-Natta catalyst systems, which are generally known and are described, for example, in P. Galli and J. C. Haylock, Progr. Polym. Sci. (1991), 16, 443. In addition to a titanium-containing solid component, Ziegler-Natta catalyst systems also contain, inter alia, a cocatalyst, suitable cocatalysts being aluminum compounds. In addition to this aluminum compound, an electron donor compound is preferably used as a further component of the cocatalyst.

The novel process is preferably carried out in the presence of a catalyst system which contains
  A) a metallocene complex and
  B) a compound forming metallocenium ions.

Particularly suitable metallocene complexes A) are those of the general formula II

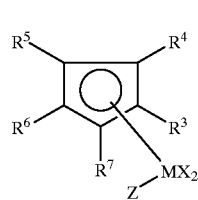

wherein:
  M is titanium, zirconium, hafnium, vanadium, niobium or tantalum,
  x is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^8$ or —$NR^8R^9$,
  $R^8$ and $R^9$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical,
  $R^3$ to $R^7$ are each hydrogen, $C_1$–$C_{20}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may furthermore form a saturated or unsaturated cyclic group of 4 to 15 carbon atoms, or $Si(R^{10})_3$,
  $R^{10}$ is $C_1$–$C_{10}$-alkyl, $C_3$–$C_{10}$-cycloalkyl or $C_6$–$C_{15}$-aryl,

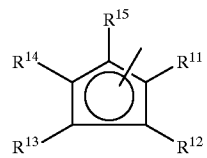

Z is X or
  $R^{11}$ to $R^{15}$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may furthermore form a saturated or unsaturated cyclic group of 4 to 15 carbon atoms, or $Si(R^{16})_3$
  $R^{16}$ is $C_1$–$C_{10}$-alkyl, $C_6$–$C_{15}$-aryl or $C_3$–$C_{10}$-cycloakyl, or $R^6$ and Z together form a group —$R^{17}$—A—,

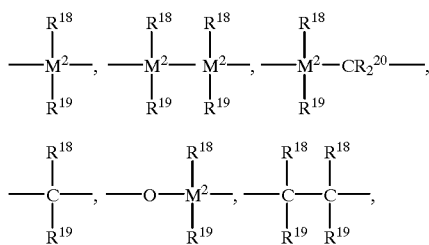

=$BR^{18}$, =$AlR^{18}$, —Ge—, —Sn—, —O—, —S—, =SO, =SO$_2$, =$NR^{18}$, =CO, =$PR^{18}$ or =P(O)$R^{18}$ ist, $R^{18}$, $R^{19}$ and $R^{20}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or two adjacent radicals together with the atoms linking them form a ring, $M^2$ is silicon, germanium or tin,

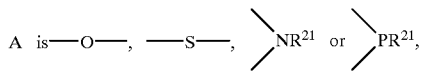

$R^{21}$ is $C_1$–$C_{10}$-alkyl, $C_6$–$C_{15}$-aryl, $C_3$–$C_{10}$-cycloalkyl, alkylaryl or Si($R^{22}$)$_3$, $R^{22}$ is hydrogen, $C_1$–$C_{10}$-alkyl or $C_6$–$C_{15}$-aryl which in turn may be substituted by $C_1$–$C_4$-alkyl, or is $C_3$–$C_{10}$-cycloalkyl, or $R^6$ and $R^{14}$ together form a group —$R^{17}$—.

Preferred metallocene complexes of the general formula II are

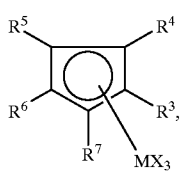

IIa

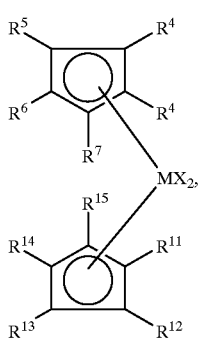

IIb

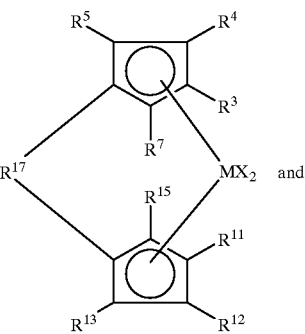

IIc and

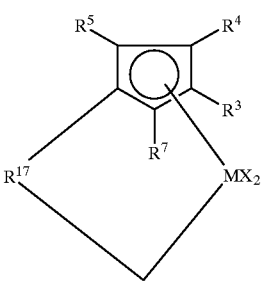

IId

The radicals X may be identical or different but are preferably identical.

Particularly preferred compounds of the formula IIa are those in which

M is titanium, zirconium or hafnium,

X is chlorine, $C_1$–$C_4$-alkyl or phenyl and $R^3$ to $R^7$ are each hydrogen or $C_1$–$C_4$-alkyl.

Preferred compounds of the formula IIb are those in which

M is titanium, zirconium or hafnium,

X is chlorine, $C_1$–$C_4$-alkyl or phenyl, $R^3$ to $R^7$ are each hydrogen, $C_1$–$C_{20}$-alkyl or Si($R^{10}$)$_3$, $R^{11}$ to $R^{15}$ are each hydrogen, $C_1$–$C_{20}$-alkyl or Si($R^{16}$)$_3$.

Particularly suitable compounds of the formula IIb are those in which the cyclopentadienyl radicals are identical.

Examples of particularly suitable compounds include:
bis(cyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(n-octadecylcyclopentadienyl)zirconium dichioride and
bis(trimethylsilylcyclopentadienyl)zirconium dichloride
and the corresponding dimethylzirconium compounds.

Particularly suitable compounds of the formula IIc are those in which $R^3$ and $R^{11}$ are identical and are each hydrogen or $C_1$–$C_{10}$-alkyl, $R^7$ and $R^{15}$ are identical and are each hydrogen, methyl, ethyl, isopropyl or tert-butyl, $R^5$ and $R^{13}$ are each $C_1$–$C_4$-alkyl $R^4$ and $R^{12}$ are each hydrogen or two adjacent radicals $R^4$ and $R^5$ on the one hand and $R^{12}$ and $R^{13}$ on the other hand together form a cyclic group of 4 to 12 carbon atoms, $R^{17}$ is 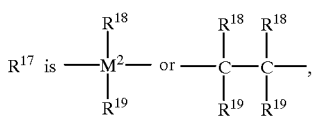

M is titanium, zirconium or hafnium and

X is chlorine, $C_1$–$C_4$-alkyl or phenyl.

Examples of particularly suitable complex compounds include dimethylsilanediylbis(cyclopentadienyl)zirconium dichloride, dimethylsilanedylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-methylindenyl)zirconium dichloride, dimethylsilanediylbis(2-methylbenzindenyl)zirconium dichloride, dimethylsilanediylbis(2-ethylbenzindenyl)zirconium dichloride, methylphenylsilanediylbis(2-ethylbenzindenyl)zirconium dichloride, methylphenylsilanediylbis(2-methylbenzindenyl)zirconium dichloride, diphenylsilanediylbis(2-methylbenzindenyl)zirconium dichloride, diphenylsilanediylbis(2-ethylbenzindenyl)zirconium dichloride, and dimethylsilanediylbis(2-methylindenyl)hafnium dichloride and the corresponding dimethylzirconium compounds.

Particularly suitable compounds of the general formula IId are those in which

M is titanium or zirconium,

X is chlorine, $C_1$–$C_4$-alkyl or phenyl, $R^{17}$ is 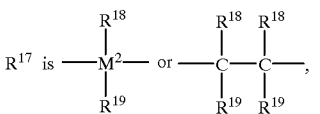

A is 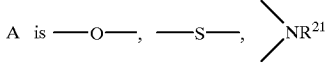

and $R^3$ to $R^5$ and $R^7$ are each hydrogen, $C_1$–$C_{10}$-alkyl, $C_3$–$C_{10}$-cycloalkyl, $C_6$–$C_{15}$-aryl or $Si(R^{10})_3$, or two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal Chem. 369 (1989), 359–370.

Mixtures of different metallocene complexes may also be used.

The catalyst system used in the novel process contains, as component B), a compound forming metallocenium ions.

Suitable compounds forming metallocenium ions are strong, neutral Lewis acids, ionic compounds having Lewis acid cations and ionic compounds having Bronsted acids as cations Preferred, strong, neutral Lewis acids are compounds of the general formula III $$M^3X^1X^2X^3 \qquad\qquad III$$

where $M^3$ is an element of group IIIA of the Periodic Table, in particular B, Al or Ga, preferably B, and $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula III are those in which $X^1$, $X^2$ and $X^3$ are identical, preferably tris(pentafluorophenyl)borane.

Suitable ionic compounds having Lewis acid cations are those of the general formula IV $$[(Y^{a+})Q_1Q_2\ldots Q_z]^{d+} \qquad\qquad IV$$

wherein

Y is an element of main groups I to VI or of sub-groups I to VIII of the Periodic Table, $Q_1$ to $Q_z$ are radicals having a single negative charge, such as $C_1$–$C_{28}$-alkyl, $C_6$–$C_{15}$-aryl, alkylaryl, arylalkyl, haloalkyl or haloaryl, each having 6 to 20 carbon atoms in the aryl radical and 1 to 28 carbon atoms in the alkyl radical, $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 d corresponds to the difference a–z, but d is greater than or equal to 1.

Carbonium cations, oxonium cations and sulfonium cations and cationic transition metal complexes are particularly suitable. The triphenylmethyl cation, the silver cation and the 1,1'-dimethylferrocenyl cation are particular examples. They preferably have noncoordinating opposite ions, in particular boron compounds as stated in WO 91/09882, preferably tetrakis(pentafluorophenyl)borate.

Ionic compounds having Bronsted acids as cations and preferably likewise noncoordinating opposite ions are mentioned in WO 91/09882, a preferred cation being N,N-dimethylanilinium.

The amount of compounds forming metallocenium ions is preferably from 0.1 to 10 equivalents, based on the metallocene complex II.

Particularly suitable compounds B) forming metallocenium ions are open-chain or cyclic alumoxane compounds of the general formula V or VI

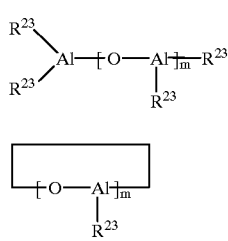

where $R^{23}$ is $C_1$–$C_4$-alkyl, preferably methyl or ethyl, and m is an integer from 5 to 30, preferably from 10 to 25.

The preparation of these oligomeric alumoxane compounds is usually carried out by reacting a solution of an aluminum trialkyl with water and is described, inter alia, in EP-A 284 708 and U.S. Pat. No. 4,794,096.

As a rule, the oligomeric alumoxane compounds obtained are present as mixtures of both linear and cyclic chain molecules of different lengths, so that m is to be regarded as an average value. The alumoxane compounds may also be present as a mixture with other metal alkyls, preferably with alkylaluminum.

Both the metallocene complexes (component A) and the compounds forming metallocenium ions (component B) are preferably used in solution, aromatic hydrocarbons of 6 to 20 carbon atoms, in particular xylenes and toluene, being particularly preferred.

Aryloxyalumoxanes as described in U.S. Pat. No. 5,391,793, aminoalumoxanes as described in U.S. Pat. No. 5,371,260, aminoalumoxanes hydrochlorides as described in EP-A 633 264, silyloxyalumoxanes, as described in EP-A 621 279 or mixtures thereof may furthermore be used as component B).

It has proven advantageous to use the metallocene complexes and the oligomeric alumoxane compound in amounts such that the atomic ratio of aluminum from the oligomeric alumoxane compound to the transition metal from the metallocene complexes is from 10:1 to $10^{6:1}$, in particular from 10:1 to $10^4$:1.

The catalyst system used in the novel process may also be applied to an inorganic or organic carrier. Preferably used carriers are finely divided carriers which preferably have a particle diameter of from 1 to 300 μm, in particular from 30 to 70 μm. Suitable inorganic carriers are, for example, magnesium chloride or silica gels, preferably those of the formula $SiO_2 \cdot a\, Al_2O_3$, where a is from 0 to 2, preferably from 0 to 0.5; these are therefore alumosilicates or silica. Such products are commercially available, for example Silica Gel 332 from Grace. Examples of suitable organic carriers are finely divided polyolefins, such as finely divided polyethylene or polypropylene.

A suitable process for providing the catalyst system, used in the novel process, with a carrier is described in Patent Application DE-A 19626834.6 or EP-A 295 312. The process described in DE-A 19626834.6 comprises in general the following process steps:

a) bringing a solution of a compound forming metallocenium ions into contact with a second solvent in which this compound is only slightly soluble, in the presence of the carrier, b) removing at least a part of the solvent from the carrier and c) bringing a solution of a mixture of a compound forming metallocenium ions and of a transition metal complex into contact with a second solvent in which this mixture is only slightly soluble, in the presence of the carrier obtained according to a) and b)

In the novel process, a compound of the general formula I is added. This compound acts as a reaction retarder and blocks the activity of the catalyst system. This blocking or deactivation of the catalyst system is reversible and, after a blocking time which is from 0.5 to 35, preferably from 5 to 25, minutes, depending on the type of catalyst system, the catalyst system becomes active again without the addition of a further compound. The activity of the catalyst system increases to the same level or even to a level up to 30% higher in comparison with a polymerization without the addition of this compound of the general formula I. The amount of the compound of the general formula I may vary within wide ranges without this playing a role with regard to blocking of the activity of the catalyst system. Amounts of from 0.1 to 10 000, preferably from 0.5 to 1000, in particular from 1 to 100, equivalents, based on the transition metal of the catalyst systems, have proven suitable.

Preferred compounds of the general formula I are those in which $M^1$ is boron or aluminum, in particular boron, and $R^1$ and $R^2$ are each hydrogen, $C_1$–$C_4$-alkyl, in particular isobutyl, $C_6$–$C_{10}$-aryl or 5- to 7-membered cycloalkyl, and $R^1$ and $R^2$ together form a cyclic group of 4 to 15, preferably 6 to 12, carbon atoms.

$R^1$ and $R^2$ together particularly preferably form a bicyclic group of 4 to 15, preferably 6 to 12, carbon atoms, for example bicyclohexanes, bicycloheptanes, bicyclooctanes, bicyclononanes or bicyclodecanes.

Particularly preferred compounds of the general formula I are:

diisobutylaluminum hydride, diisobutylboron hydride, dicyclohexylaluminum hydride and 9-borabicyclo[3.3.1]nonane.

Mixtures of different compounds of the general formula I may also be added. Compounds of the general formula I and processes for their preparation are known per se and are described, for example, in Encyclopedia of Inorg. Chem., ed. R. B. King, (1994), Vol. 1, page 116 et seq. and page 401 et seq.

It has proven to be preferable if compounds of the general formula I are used as solution. Suitable solvents are, for example, aromatic hydrocarbons, such as benzene, toluene, ethylbenzene or mixtures thereof, and aliphatic hydrocarbons, such as pentane, heptane or mixtures thereof.

Compounds of the general formula I may be added in any desired order, for example in such a way that the monomer is initially taken with the compound of the general formula I and the catalyst system is then added, or the catalyst system is mixed with the compound of the general formula I and the monomer is then added. Other orders of combination are also possible; the compound of the general formula I may also be premixed with the compound B) forming metallocenium ions or with another cocatalyst. It is also possible initially to take the monomer and to add the catalyst system together with the compound of the general formula I.

It is also possible initially to take the monomer and the catalyst system and then to add the compound of the general formula I, but the timespan must be chosen so that the catalyst system cannot fully display its activity. This timespan depends on the type of catalyst system and may be up to 5 minutes, preferably up to 1 minute.

The catalyst system used in the novel process may, if required, also contain a metal compound of the general formula IV $$M^4(R^{24})_r(R^{25})_s(R^{26})_t \qquad \qquad IV$$

where

M$^4$ is an alkali metal, an alkaline earth metal or a metal of group IIIA of the Periodic Table, ie. boron, aluminum, gallium, indium or thallium, R$^{24}$ is $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical, R$^{25}$ and R$^{26}$ are each halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical, r is an integer from 1 to 3 and s and t are each integers from 0 to 2, the sum r+s+t corresponding to the valency of M$^4$.

Preferred metal compounds of the general formula IV are those in which

M$^4$ is lithium, magnesium or aluminum and

R$^{24}$ to R$^{26}$ are each $C_1$–$C_{10}$-alkyl.

Particularly preferred metal compounds of the formula IV are n-butyllithium, n-butyl-n-octylmagnesium, n-butyl-n-heptylmagnesium, tri-n-hexylaluminum, tri-isobutylaluminum, triethylaluminum and trimethylaluminum.

If metal compound IV is used, it is preferably present in the catalyst system in an amount of from 800:1 to 1:1, in particular from 500:1 to 50:1 (molar ratio of M$^4$ from IV to transition metal).

The order of addition of the metal compound IV is also not critical. In a suitable process, transition metal catalyst, compound I and metal compound IV are metered together into the reactor, or compound I and compound IV are premixed and then brought into contact with the catalyst.

The novel process for the preparation of polymers of $C_2$–$C_{12}$-alkenes is distinguished by the fact that active catalyst systems can be temporarily deactivated or blocked, so that no troublesome polymerization phenomena occur, but the deactivated or blocked catalyst systems become active again without the addition of further compounds. Moreover, when they become active again, these deactivated or blocked catalyst systems have higher activity than those which were not deactivated or blocked. Furthermore, a uniform distribution of the catalyst systems of the reactor is permitted in the novel process, so that local concentrations which may otherwise lead to pronounced hot spots during the polymerization are avoided.

EXAMPLES

Example 1

Addition of the Reaction Retarder During the Reaction (propene)

In a 1 l steel autoclave, 350 g of propene were condensed and were heated to 50° C. A solution of 80 mg (0.1 mmol) of bis(octadecylcyclopentadienyl)zirconium dichloride in 32 ml of a 1.7 molar solution of methylalumoxane (MAO) in toluene was added to this (Al:Zr =500:1). The temperature difference between the cooling medium and the double jacket and the reactor temperature increased by 8° C. after the addition of the catalyst system. After 5 minutes, 1 ml of 0.5 molar solution of 9-borabicyclo[3.3.1]-nonane in hexane, to which 20 ml of ethylbenzene has been added, was introduced. The temperature difference decreased to 0.5° C. in the course of 2 minutes, and increased again to 8° C. in the course of 25 minutes. The total polymerization time was 2 hours. After the autoclave had been let down and the unconverted propene separated off, 320 g of liquid propene oligomer were obtained.

Molecular weight $M_n$: 640 g/mol; $M_w/M_n$: 2.1.

The molecular weights $M_n$ (number average) and $M_w$ (weight average) were determined by means of gel permeation chromatography (solvent: tetrahydrofuran, polystyrene standard).

Comparative Example VI: Polymerization Without Reaction Retarder

The procedure was as in Example 1, except that no 9-borabicyclo-[3.3.1)nonane was added. After the addition of the catalyst system, the temperature difference likewise increased by 8° C. and began to decrease slowly after 50 minutes. 330 g of liquid propene oligomer were obtained.

Molecular weight $M_n$: 650 g/mol; $M_w/M_n$: 2.2.

Examples 2 to 4

Premixing of the Reaction Retarder With the Catalyst System (propene).

Example 2

The procedure was as in Example 1, except that a solution of 80 mg of bis(octadecylcyclopentadienyl)zirconium dichloride in 32 ml of 1.7 molar solution of MAO in toluene and 1 ml of 0.5 molar 9-borabicyclo[3.3.1]nonane were added to the propene (Al:Zr=500:1, Zr=5:1). The temperature difference relative to the cooling medium increased by 4° C. and decreased to 0° C. after 30 seconds. It increased to 8° C. over the course of 25 minutes and began to decrease slowly after a further 40 minutes. 320 g of liquid propene oligomer were obtained.

Molecular weight $M_n$: 650 g/mol; $M_w/M_n$: 2.2.

Example 3

The procedure was as in Example 2, except that 10 ml of the 0.5 molar 9-borabicyclo[3.3.1]nonane solution were added. 320 g of liquid propene oligomer were likewise obtained. The curve of the reactor temperature and the temperature difference relative to the cooling medium were as in Example 2.

Molecular weight $M_n$: 650 g/mol; $M_w/M_n$: 2.2;

Example 4

The procedure was as in Example 2, except that a solution of 11.8 mg (0.02 mmol) of dimethylsilylbis(2- methylbenzindenyl)zir-conium dichloride in 12.4 ml of 1.7 molar solution of MAO in toluene (Al:Zr=100:1), which had been mixed with 0.5 ml of 0.5 molar 9-borabicyclo[3.3.1]nonane in hexane, was added to the propene.

The temperature different increased by 10° C. in the course of 20 minutes and began to decrease after 70 minutes. The total polymerization time was 90 minutes. 310 g of isotactic polypropylene were obtained as a white powder.

Molecular weight $M_n$: 148 000 g/mol; $M_w/M_n$: 2.1; Melting point: 158° C.

Comparative Example V2
Polymerization Without Reaction Retarder

The procedure was as in Example 4 but without the addition of 9-borabicyclo[3.3.1]nonane. The temperature difference increased abruptly by 10° C. in the course of 20 seconds and began to decrease after 70 minutes. 300 g of isotactic polypropylene were obtained as a white powder.

Molecular weight $M_n$: 144 000 g/mol; $M_w/M_n$: 2.2; Melting point: 158° C.

Comparative Example V3

The procedure was as in Comparative Example V2, except that the catalyst system was added in two portions (50% by weight each). After the first metering of the catalyst system, the feed line was blocked with solid isotactic polypropylene as a result of polymerization so that a second metering was no longer possible.

Example 5

The procedure was as in Example 2, except that 1 ml of 0.5 molar solution of diisobutylaluminum hydride in toluene was added instead of 9-borabicyclo[3.3.1]nonane. The curve of the temperature difference was as in Example 2.

Example 6
Premixing of the Reaction Retarder With the Catalyst System (ethylene)

500 ml of pentane were initially taken in a 1 l three-necked flask with reflex condenser. A solution of 22.9 mg (0.1 mmol) of biscyclopentadienylzirconium dichloride in 32 ml of a 1.7 molar solution of MAO in toluene and 2 ml of a 0.5 molar solution of 9-borabicyclo[3.3.1]nonane in hexane was added to this.

100 g of ethylene/hour were then passed in at atmospheric pressure. The temperature difference between the feed and the reflux of the reflux condenser, which temperature difference is proportional to the reaction rate, increased by 4° C. in the course of 10 minutes. After 5 hours, 460 g of crystalline polyethylene powder were obtained.

Molecular weight $M_n$: 290 000 g/mol; $M_w/M_n$: 2.3; Melting point: 107° C.

Comparative Example V4

The procedure was as in Example 5, but without the addition of 9-borabicyclo[3.3.1]nonane. The temperature difference increased by 4° C. in the course of 1 minute. 440 g of crystalline polyethylene powder were obtained.

Molecular weight $M_n$: 278 000 g/mol; $M_w/M_n$: 2.4; Melting point: 107° C.

Example 7
7.1 Preparation of the Supported Catalyst 10 g of silica gel SG 332 (from Grace) were partially dehydrated under reduced pressure for 8 hours at 180° C. and then suspended in 40 ml of toluene, and 75 ml of 1.53 molar methylalumoxane (in toluene, from Witco) was then added at room temperature. After 12 hours, 75 ml of isododecane were added to the silica gel deactivated with methylalumoxane, and stirring was carried out for a further 1.5 hours at room temperature. Thereafter, the carrier was filtered off, washed with twice 20 ml of toluene and twice 20 ml of pentane and dried in a nitrogen fluidization stream.

Silica gel deactivated with methylalumoxane is added to a mixture of 525 g of bis(3,3'-(2-methylbenzo[e]indenyl)]dimethylsilanediylzirconium dichloride, 120 ml of 1.53 molar methylalumoxane solution (in toluene, from Witco) while stirring was carried out at room temperature. After 20 hours, 200 ml of isododecane were added slowly and in a controlled manner in the course of 4 hours and stirring was carried out for a further 1.5 hours at room temperature. Thereafter, the solid was filtered off, washed with 25 ml of pentane and dried in a nitrogen fluidization stream. The yield of supported catalyst was 15.9 g.

7.2 Comparative Polymerization V5

50 g of coarse polypropylene powder were initially taken in a dry 10 l autoclave flushed with nitrogen, and 7 l of propene was subjected to condensation at a stirred speed of 350 rpm at 25° C. Thereafter, the mixture was heated to an internal temperature of 65° C. and 200 mg of supported catalyst were added to the autoclave via a metering lock, in the presence of 10 ml of triisobutylaluminum (2 M in heptane). The heat of reaction evolved during the polymerization was removed by cooling so that the internal temperature was kept constant. The difference between the forward flow temperature of the coolant and the internal temperature as a function of time was determined on-line. The maximum temperature difference $\Delta T_{max}$ of 7.5° C. was reached after only 6 minutes, tapping noises were heard from the stirrer after only 8 minutes and the polymerization had to be terminated after a further 35 minutes owing to the formation of agglomerates and coatings. The yield of highly agglomerated coarse polymer powder was 645 g of coarse polypropylene powder, corresponding to a productivity of 2,970 g of PP/g of catalyst.

Example 8

The Preparation of the Catalyst Was Carried Out Analogous to Example 7.1.

The parameters of the polymerization were chosen analogous to example 7.2. Here, 200 mg of supported catalyst were added to the autoclave via a metering lock, in the presence of 9 ml of triisobutylaluminum (2 M in heptane) and 1 ml of diisobutylaluminum hydride (2 M in heptane). The heat of reaction evolved during polymerization was removed by cooling so that the internal temperature was kept constant. The difference between the forward flow temperature of the coolant and the internal temperature as a function of time was determined on-line. The maximum temperature different $\Delta T_{max}$ of 5.8° C. was reached after 15 minutes. In comparison with example 7.2, the polymerization started more slowly and the $\Delta T$ values in example 8 are at a substantially higher level (from 1.5 to 2° C.) after reaching the maximum temperature. After a total of 60 minutes, the polymerization was terminated. After the end of the polymerization, the pressure was let down to atmospheric pressure in the course of 10 minutes and the resulting polymer was discharged in the nitrogen stream. The product morphology was of excellent quality and fused particles, fragmentation and reactor coatings were avoided. 1,240 g of a coarse polymer powder were obtained, corresponding to a productivity of 5,950 g of PP/g of catalyst.

Example 9

The Preparation of the Catalyst Was Carried Out Analogous to Example 7.1.

The parameters of the polymerization were chosen analogous to example 7.2. Here, a mixture of 9 ml of triisobutylaluminum (2 M in heptane) and 1 ml of diisobutylaluminum hydride (2 M in heptane) was added to 200 mg of supported catalyst and the mixture was allowed to stand for 4 hours at room temperature. The catalyst suspension was then added to the autoclave via a metering lock. The heat of reaction evolved during polymerization was removed by cooling so that the internal temperature is kept constant. The difference between the forward flow temperature of the coolant and the internal temperature as a function of time was determined on-line. The maximum temperature difference $\Delta T_{max}$ of 5.3° C. was reached after 18 minutes. In comparison with Example 7.2, the polymerization started more slowly and the $\Delta T$ values in example 9 are at a substantially higher level (1.5 to 2.3° C.) after reaching the maximum temperature. After a total of 60 minutes, the polymerization was terminated. After the end of polymerization, the pressure was let down to atmospheric pressure in the course of 10 minutes and the resulting polymer was discharged in the nitrogen stream. The product morphology was of excellent quality and fused particles, fragmentation and reactor coatings were avoided. 1,320 g of coarse polypropylene powder were obtained, corresponding to a productivity of 6,350 g of PP/g of catalyst.

Example 10

The Preparation of the Catalyst Was Carried Out Analogous to Example 7.1.

50 g of coarse polypropylene powder and a mixture of 9 ml of triisobutylaluminum (2 M in heptane) and 1 ml of diisobutylaluminum hydride (2 M in heptane) were added in succession to a dry 10 l autoclave flushed with nitrogen, and stirring was carried out for 15 minutes. Thereafter, 200 mg of supported catalyst were introduced into the reactor countercurrent to the nitrogen and the reactor was closed and was filled with 7 l of liquid propylene at a stirrer speed of 350 rpm at 25° C. After prepolymerization for 30 minutes, the temperature was gradually increased to 65° C. Polymerization was then carried out at an internal temperature of 65° C. for 60 minutes. After the end of the polymerization, the pressure was let down to atmospheric pressure in the course of 10 minutes and the resulting polymer was discharged in the nitrogen stream. 1,360 g of coarse polypropylene powder were obtained, corresponding to a productivity of 6,550 g of PP/g of catalyst. The product morphology was of excellent quality and fused particles, fragmentation and reactor coatings were avoided.

Example 11

The procedure for the silica gel deactivation was analogous to that of Example 7.1. When providing metallocene with a carrier, the diisobutylaluminum hydride was integrated directly into the catalyst preparation. The following change was made here:

The methylalumoxane-deactivated silica gel was added to a mixture of 525 g of bis[3,3'-(2-methylbenzo[e]indenyl)] dimethylsilanediylzirconium dichloride and 120 ml of 1.53 molar methylalumoxane solution (in toluene, from Witco) and stirring was carried out at room temperature. After 20 hours, a solution of 200 ml of isododecane and 5 ml of diisobutylaluminum hydride (2 M in heptane) was added slowly and in a controlled manner in the course of 4 hours and stirring was carried out for a further 1.5 hours at room temperature. The solid was then filtered off, washed with 25 ml of pentane and dried in a nitrogen fluidization stream. The yield of supported catalyst was 16.0 g.

The polymerization was carried out analogous to Example 10, 10 ml of triisobutylaluminum (2 M in heptane) being used instead of the triisobutylaluminum/diisobutylaluminum hydride mixture. 1,270 g of coarse polypropylene powder were obtained, corresponding to a productivity of 6,100 g of PP/g of catalyst.

Comparative Example V6

The Preparation of Catalyst Was Carried Out Analogous to Example 7.1.

The polymerization was carried out analogous to Example 10 (prepolymerization), 10 ml of triisobutylaluminum (2 M in heptane) being used instead of the triisobutylaluminum/diisobutylaluminum hydride mixture. 1,060 g of coarse polypropylene powder were obtained, corresponding to a productivity of 5,050 g of PP/g of catalyst.

We claim:

1. A process for the preparation of polymers of $C_2$–$C_{12}$-alkenes at from −50 to 300° C. and from 0.5 to 3000 bar in the presence of a catalyst system comprising a metallocene complex, wherein a compound of the formula I

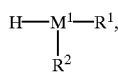

wherein
   $M^1$ is boron and
   $R^1$ and $R^2$ are each hydrogen, $C_1$–$C_{15}$-alkyl, $C_6$–$C_{15}$-aryl, alkylaryl or arylalkyl, each having 1 to 10 carbon atoms in the alkyl radical and 6 to 20 carbon atoms in the aryl radical, or 5- to 7-membered cycloalkyl which in turn may carry $C_1$–$C_{10}$-alkyl as a substituent, or $R^1$ and $R^2$ together form a cyclic group of 4 to 15 carbon atoms, is added as a reaction retarder.

2. The process of claim 1, wherein $R^1$ and $R^2$ in the formula I together from a bicyclic group of 4 to 15 carbon atoms.

3. The process of claim 1, wherein the catalyst system contains
   A) a metallocene complex and
   B) a compound causing the formation of metallocenium ions.

4. The process of claim 3, wherein the compound causing the formation of metallocenium ions are open-chain or cyclic alumoxane compounds of the formula V or VI

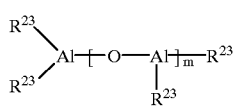

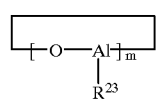

where $R^{23}$ is $C_1$–$C_4$-alkyl, and m is an integer from 5 to 30.

5. The process of claim 3, wherein a metal compound of the formula IV

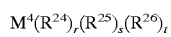

where
- $M^4$ is an alkali metal, an alkaline earth metal or a metal group III of the Periodic Table,
- $R^{24}$ is $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical
- $R^{25}$ and
- $R^{26}$ are each halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
- r is an integer from 1 to 3 and
- s and t are each integers from 0 to 2, the sum r+s+t corresponding to the valency of $M^4$, is present.

6. The process of claim 3, wherein the metallocene complex is of the formula IIb or IIc

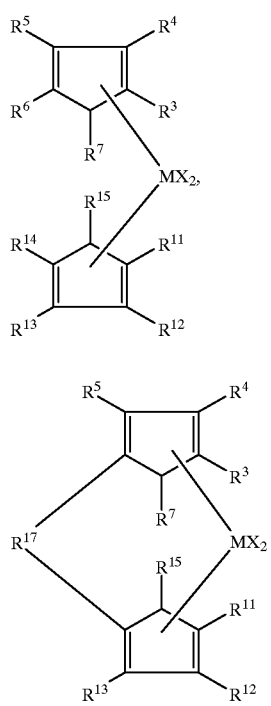

wherein:
- M is titanium, zirconium or hafnium,
- X are each fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^8$ or $NR^8R^9$ wherein
- $R^8$ and $R^9$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical,
- $R^3$ to $R^7$ are each hydrogen, $C_1$–$C_{20}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may furthermore form a saturated or unsaturated cyclic group of 4 to 15 carbon atoms, or $Si(R^{10})_3$,
- $R^{10}$ is $C_1$–$C_{10}$-alkyl, $C_3$–$C_{10}$-cycloalkyl or $C_6$–$C_{15}$-aryl,
- $R^{11}$ to $R^{15}$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may furthermore form a saturated or unsaturated cyclic group of 4 to 15 carbon atoms, or $Si(R^{16})_3$,
- $R^{16}$ is $C_1$–$C_{10}$-alkyl, $C_6$–$C_{15}$-aryl or $C_3$–$C_{10}$-cycloalkyl, or $R^6$ and Z together may form a group —$R^{17}$—A—,

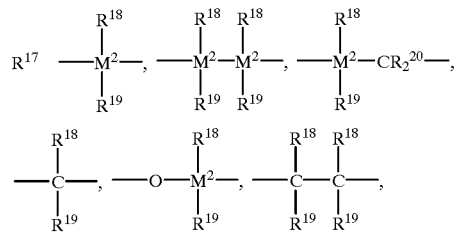

=$BR^{18}$, =$AlR^{18}$, —Ge—, —Sn—, —O—, —S—, =SO, =$SO_2$, =$NR^{18}$, =CO, =$PR^{18}$ or =$P(O)R^{18}$ ist, $R^{18}$, $R^{19}$ and $R^{20}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_{7–C40}$-arylalkyl, $C_8$–$C_{10}$-arylalkenyl or $C_7$–$C_{40}$-alkylaryl, or two adjacent radicals together with the atoms linking them form a ring.

7. The process of claim 5, wherein compound IV is present in catalyst in a molar ratio of $M^4$ from IV to a transition metal of the metallocene complex of from 500:1 to 50:1.

* * * * *

UNITED STATES PATENT AND TRADEMARK OFFICE
CERTIFICATE OF CORRECTION

PATENT NO.    : 6,127,495
DATED         : October 3, 2000
INVENTOR(S)   : Roesch et al.

Page 1 of 1

It is certified that error appears in the above-identified patent and that said Letters Patent is hereby corrected as shown below:

Column 16, claim 6,
Line 23, delete the entire line, i.e. "or $R^6$ and Z together may form a group -$R^{17}$-A-,"
Line 42, "$C_{7-C40}$" should be -- $C_7$-$C_{40}$ --.

Signed and Sealed this

Eighteenth Day of September, 2001

Attest:

NICHOLAS P. GODICI
Attesting Officer   Acting Director of the United States Patent and Trademark Office